United States Patent [19]

Yamaguchi et al.

[11] Patent Number: 4,828,353
[45] Date of Patent: May 9, 1989

[54] SUBMERSIBLE OPTICAL WET CONNECTOR

[75] Inventors: Masayoshi Yamaguchi; Toshio Hagihara, both of Osaka, Japan

[73] Assignees: Japan National Oil Corp., Tokyo; Sumitomo Electric Industries, Ltd., Osaka, both of Japan

[21] Appl. No.: 71,667

[22] Filed: Jul. 2, 1987

[51] Int. Cl.$^4$ .................................................. G02B 6/38
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 3,948,582 | 4/1976 | Martin | 350/96.21 |
| 4,076,376 | 2/1978 | Slaughter | 350/96.21 |
| 4,447,121 | 5/1984 | Cooper et al. | 350/96.20 |
| 4,448,483 | 5/1984 | Ryley, Jr. | 350/96.21 |
| 4,606,603 | 8/1986 | Cairns II | 350/96.21 |
| 4,616,900 | 10/1986 | Cairns | 350/96.2 |
| 4,666,242 | 5/1987 | Cairns III | 350/96.21 |
| 4,682,848 | 7/1987 | Cairns et al. | 350/96.21 |
| 4,708,432 | 11/1987 | Berg | 350/96.21 |

Primary Examiner—John D. Lee
Attorney, Agent, or Firm—Wenderoth, Lind & Ponack

[57] ABSTRACT

An optical connector assembly has a female connector having a recess formed in its front surface, and a male connector having a cavity and having a projection formed on its front surface which is partly or entirely deformable so that the tip of an optical fiber supported by the projection will ensuredly be fitted into the innermost portion of the recess. Incoming/outgoing beam surfaces at the innermost part of the recess and at the tip of the projection are defined by the end faces of optical fibers extending through the female and male connectors. A collimater lens may be provided on the end face of each optical fiber for enlarging the diameter of transmitted beams and for deflecting the beams in parallel, so that transmission loss caused by dust in the water is kept to a minimum level. A device for forming jet streams is provided at the joint surfaces of the male and female connectors which serves to jet water or a detergent stored in a storage chamber to the end faces of both optical fibers and to blow away dust, when the connectors are connected, thereby reducing the transmission loss caused by the dust.

15 Claims, 2 Drawing Sheets

SUBMERSIBLE OPTICAL WET CONNECTOR

BACKGROUND OF THE INVENTION

The present invention relates to a submersible optical wet connector assembly adapted to be connected and used in the water.

Submersible optical connectors are divided into two types, the dry type and the wet type. The dry type connector is mateable and dismateable in air, while the wet type connector is mateable and dismateable in water.

Since an optical connector does not have to be insulated, it appears to be feasible to connect a dry type connector in the water. But this causes the following problems.

An optical connector is usually connected manually by a diver in the water. Therefore, male and female connectors are easily coupled and clamped with screws by the diver, even if the coupling accuracy is preset to be high to minimize the connection loss. However, in deep/water area inaccessible to a diver, the connection and disconnection of the connectors have to be made by remote control. It is difficult to expect that such a delicate operation as that performed manually can be performed. Thus, only a slight misalignment of the male or female connector often makes the connection operation difficult, or too much contact surface pressure on both male and female connectors might break the optical fibers.

Also, it is highly probable that dust or microbes in the water will invade the tips of the connectors to form an intercepting screen for the transmitted beams thereby increasing the connection loss.

SUMMARY OF THE INVENTION

An object of the present invention is to provide a wet type submersible optical connector assembly which obviates the above-described problems.

According to the present invention, event if the male and female connectors are out of alignment, a flexible tip of the projection of the male connector will be guided along a frusto-conical recess of the female connector into its deepest part. The expansion and contraction of the optical fiber in the male connector is absorbed by slackness of the optical fiber in the cavity of the male connector. Thus, there is no need for establishing a high precision alignment of the connectors. The male and female connectors will be reliably connected with minimum transmission loss even if the connection is carried out by remote-controlling a less versatile equipment.

Furthermore, the flexibility of the male connector at its tip serves to reduce the contact surface pressure between the incoming/outgoing beam surfaces at the male and female connectors. This makes it possible to bring the incoming/outgoing beam surface into direct contact with each other to reduce the connection loss without the fear of damage to the surfaces, optical fibers and collimater lenses.

The means for forming jet streams, which acts as a kind of pump, jets a stream of liquid, produced during the connection operation, to the beam connecting portion through the discharge hole. Thus, dust and the like deposited on the incoming/outgoing beams surfaces or present between them is blown away. There is little dust left in the connector which might intercept transmitted beams when the connection is complete.

The pumping action and the resulting detergent action are repeatable. This repeatability makes it possible to disconnect and reconnect the connectors after they have been connected at any time when beam transmission loss is observed due to the existence of dust or the like in the connector, so that the transmission loss is kept to a minimum.

The means for forming jet streams is activated by the insertion of the connector, and requires no pumping system actuated by an external power supply. Thus the means for forming jet streams is simple in construction and can be manufactured at a low cost.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENTS

Figure 1:
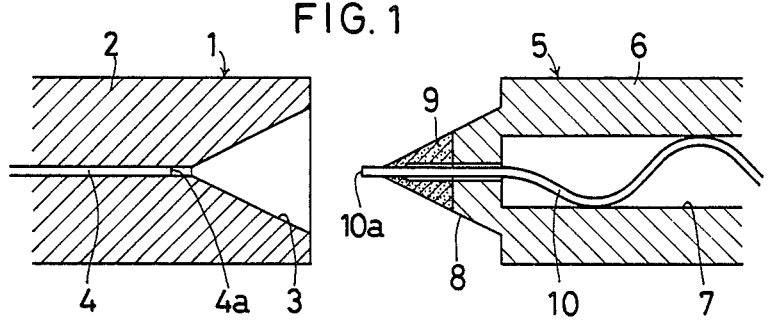
FIGS. 1-7 are sectional views of the first to seventh embodiments of the present invention.

FIG. 1 shows a submersible optical wet connector assembly having incoming/outgoing surfaces defined by end faces of respective optical fibers. Numeral 1 generally designates a female connector comprising a body 2 made of a stain-resistant material such as aluminum or stainless steel and having a frusto-conical recess 3 formed in its front end. The inner diameter of the recess 3 at its deepest portion is substantially equal to the outer diameter of an optical fiber in a male connector (described below) so that the male connector having the optical fiber can be fitted into the female connector. In the body 2 is provided an optical fiber 4 having its beam incoming/outgoing surface 4a arranged concentrically with the body and disposed near the deepest portion of the recess 3.

Figure 2:
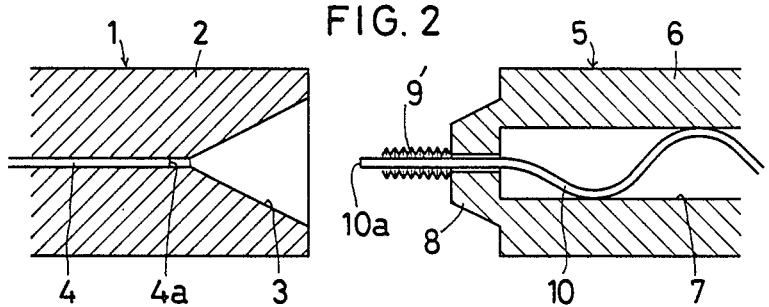

Numeral 5 generally designates a male connector to be connected with the female connector. Its body 6 is made of the same material as the body of the female connector 1 and is formed with a cavity 7. On the front end of the body 6 of a projection 8 adapted to be fitted into the recess 3 of the female connector 1. The entire projection 8 may be flexible. In the embodiment of FIG. 1, flexible material such as silicone rubber is used only at a tip portion shown by numeral 9. In FIG. 2, the tip portion is formed by a flexible tube 9'. Hereinafter, this portion will be referred to as a flexible portion. The optical fiber 10 provided in the male connector 5 has its beam incoming/outgoing surface 10a arranged concentrically with the projection 8, and is supported by the flexible portion 9 only at the portion adjacent its tip. From this portion rearwardly toward the cavity 7, the optical fiber 10 extends loosely through the body 6. The optical fiber 10 is slack in the cavity 7 so that expansion and contraction of the optical fiber caused by the deformation of the flexible portion 9 is accommodated for.

Figure 3:
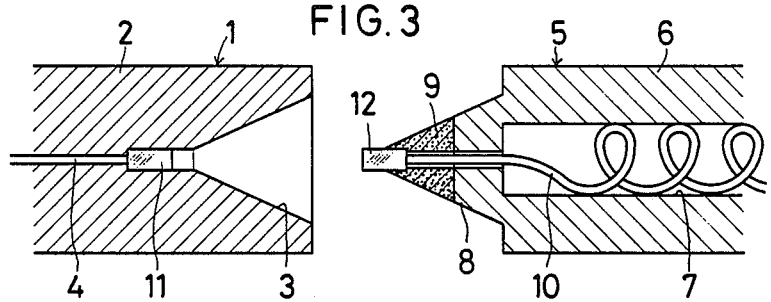

As shown in FIG. 3, it is preferable to provide each of the optical fibers 4 and 10 at their tips with a collimeter lens 11, 12, respectively, to enlarge the diameter of transmitted beams and to deflect the beams in parallel. In this case, the diameter of the recess 3 at its innermost portion should be substantialy equal to the diameter of the lens.

With the submersible optical connector as described above, the optical fiber or collimater lens on the male connector side can be fitted into the deepest portion of the recess 3 of the female connector with correct alignment, thus allowing optical signals to be transmitted with accuracy.

With a connector assembly having collimater lenses as shown in FIG. 3, the connection loss of transmitted beams is lower than in the connector shown in FIG. 1 even if microbes or dust floating in the water become positioned between the incoming/outgoing surfaces of the connector. Since the core diameter of an optical fiber is generally about 50 microns, it is probable that dust or the like existing between the incoming/outgoing surfaces will completely prevent the transmission of beams, if the optical fibers on the male and female sides are directly connected. By interposing the collimater lenses therebetween, however, the diameter of beams is expanded to 1-2 mm, thus lowering the ratio of the screening of beams by dust and maintaining the connection loss at a relatively low level.

Figure 4:
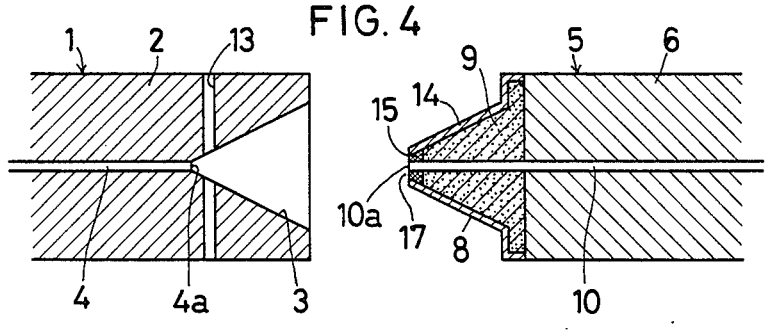

In the fourth embodiment shown in FIG. 4, the male connector is provided with a water storage section to form jet streams. Numeral 1 designates a female connector comprising a body 2 made of stainless steel or aluminum and formed with a frusto-conical recess 3 in its front wall. The body 2 is adapted to hold an optical fiber 4 so as to have its beam incoming/outgoing surface 4a arranged at the innermost part of the recess 3 and to be concentric therewith. Also provided in the body 2 is a drain hole 13 radially exending through the body near the surface 4a.

A male connector 5 has a body 6 made of the same material as the body of the female connector 1. The body 6 is formed on its front end with the projection 8 adapted to be fitted into the recess 3 of the female connector 1. An optical fiber 10 arranged concentrically with the projection 8 is mounted in the male connector 5 with its beam incoming/outgoing surface 10a at the tip of the projection.

The projection 8 comprises a compressible and waterproof shell 14, a self-restoring spongy absorbent member 9 forced in the shell, and a filter 15 provided in the opening at the tip of the shell, which in combination constitute a water storage section for the formation of jet streams.

The water storage section is pressed against the front of the female connector 1 and the peripheral surface defining its recess 3 when the male connector 5 is connected to the female connector 1, so that the water absorbed in the member 9 is discharged through the filter 15 and the discharge port 17, which also serves as an inlet port, toward the end of the optical fiber in the female connector 1. Thus, the jet stream of water washes the surface 4a and the area adjacent thereto. The jet stream deflected therefrom then washes the surface 10a and the area adjacent thereto as well.

Figure 5:
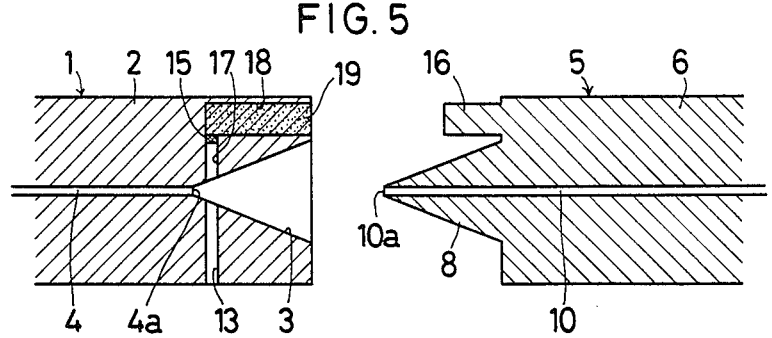

In the fifth embodiment shown in FIG. 5, the female connector body 2 is provided with a cylinder 18 which acts as a water storage section. The male connector 5 is provided with a piston 16 protruding from the front end of its body and having an outer diameter which is substantially equal to the inner diameter of the cylinder 15, so that the piston 16 can be inserted into the cylinder to form a jet stream. The absorbent member 19 may or may not be provided in the cylinder 18 in this embodiment.

Although in the embodiments shown in FIGS. 4 and 5 the discharge port 17 also serves as an inlet port, an inlet port having a check valve may be formed separately from a discharge port.

Figure 6:
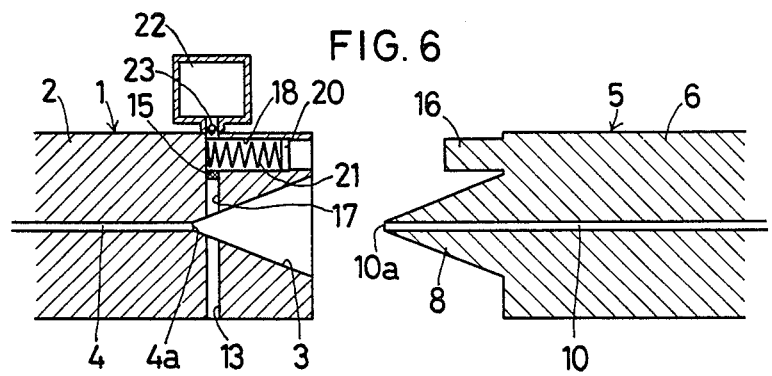

In the sixth embodiment shown by FIG. 6, the cylinder 18 is provided therein with a movable plate 20 adapted to be moved by the piston 16 so as to compress detergent in the cylinder 18 and a compression coil spring 21 to jet the detergent toward the end faces of the optical fibers. A detergent tank 22 is in communication with the cylinder 18 through a channel, and is provided with a check valve 23 so that the detergent will flow only from the tank 22 to the cylinder 18. Thus, the cylinder 18 is filled with a detergent which is discharged toward the end faces of the optical fibers only when compressed. When the connector is disconnected, the compression spring 21 pushes back the movable plate 20, drawing the detergent into the cylinder 18 from the tank 22. Collimater lenses may be mounted on the end surfaces 4a and 10a of the optical fibers 4, 10. A matching oil such as a silicone oil should preferably be used as a detergent in order to minimize the connection loss in the optical connector.

Figure 7:
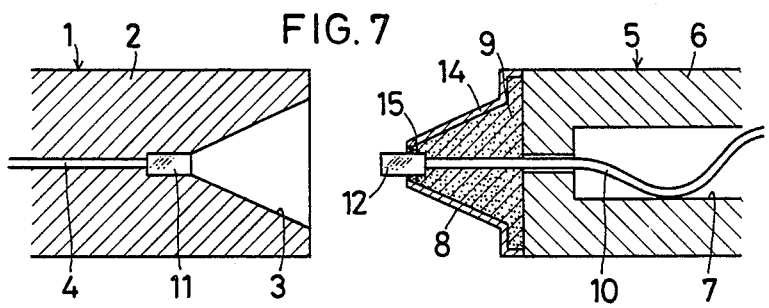

FIG. 7 shows the seventh embodiment which is a modification of the embodiment of FIG. 4. As in the first to third embodiments, the male connector 5 is formed with a cavity 7 through which the optical fiber 10 extends loosely. Also, as in the third embodiment of FIG. 3, collimater lenses are attached to the ends of the optical fibers 4, 10.

Figure 8:
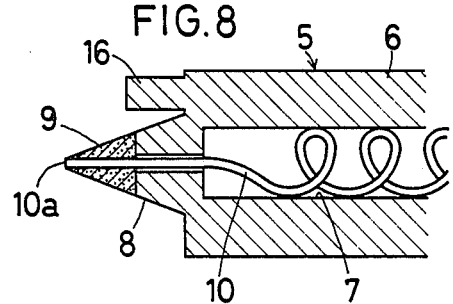
FIG. 8 is a sectional view of the male connector of the eighth embodiment.

FIG. 8 shows the eighth embodiment which is a modification of the fifth embodiment shown in FIG. 5, in which at least the tip portion of the projection 8 is made of a flexible material such as silicone rubber, and the optical fiber 10 extends loosely through the body 6 of the male connector 5 and through the cavity 7 formed in the body 6.

The present invention can also be applied to an optical connector which is not provided with the frusto-conical recess 3 and the projection 8. In that case, no discharge port will be required.

What is claimed is:
1. A submersible optical wet connector assembly comprising:
   a first connector comprising a female connector body having a free end,
   said female connector body having a frusto-conical recess extending therein at said free end, a hole extending therein open to said frusto-conical recess at a bottommost portion thereof, and a first optical transmitting means disposed in said hole and having a free end thereof terminating adjacent said bottommost portion of said frusto-conical recess, said free end of said first optical transmitting means including a respective incoming/outgoing surface; and
   a second connector comprising a male connector body for mating with said female connector body,
   said male connector body having a cavity extending therein, a respective end portion, a projection extending from said respective end portion of said male connector body and terminating at a tip, a second optical transmitting means extending through the entirety of said projection and having an incoming/outgoing surface defined at an end thereof terminating at said tip or at a location dis- posed outwardly from said tip for confronting said incoming/outgoing surface of said first optical transmitting means when said first and said second connectors have been brought together to mate said male connector body and said female connector body, and a flexible guide means engaging said second optical transmitting means for guiding said incoming/outgoing surface of said second optical transmitting means toward said incoming/outgoing surface of said first optical transmitting means adjacent said bottommost portion of said frusto-conical recess by deforming in said recess when contacting said female connector body as said first and said second connectors are brought toward one another with said frusto-conical recess opposing but in a misaligned state with said projection, said second optical transmitting means also extending loosely through said cavity in a slackened state so as to be tautenable when said flexible guide means deforms.

2. A submersible optical web connector assembly as claimed in claim 1,
wherein said flexible guide means comprises at least said tip of said projection.

3. A submersible optical wet connector assembly as claimed in claim 1,
wherein said first and said second optical transmitting means are respective optical fibers, and said incoming/outgoing surface of each of said connector bodies are respective end faces of said optical fibers.

4. A submersible optical wet connector assembly as claimed in claim 1,
wherein said first and said second optical transmitting means each include a collimator lens, and said incoming/outgoing surface of each of said connector bodies are respective end faces of each said collimator lens.

5. A submersible optical wet connector assembly as claimed in claim 1,
and further comprising a liquid storage section integral with one of said connectors for containing a predetermined volume of liquid, a liquid discharge port in communication with said liquid storage section and open at a location adjacent to said incoming/outgoing surfaces when such are confronting, and a pressurizing section integral with one of said connectors for compressing said liquid storage section as said first and said second connectors are brought toward one another to discharge liquid retained in said liquid storage section therefrom and through said discharge port as a jet stream directed toward said incoming/outgoing surfaces.

6. A submersible optical wet connector assembly as claimed in claim 5,
wherein said liquid storage section comprises a self-restorable absorbent member and a waterproof shell in which said absorbent member is contained.

7. A submersible optical wet connector assembly as claimed in claim 6,
wherein said liquid storage section is integral with said male connector.

8. A submersible optical wet connector assembly as claimed in claim 5,
wherein said liquid storage section comprises a portion of one of said connectors having a bore extending therein, said bore open at the end of said one of said connectors, and said pressurizing section comprises a piston protruding from the end of said other of said connectors, said piston having an outer diameter substantially equal to the diameter of said bore so as to be extendable in said bore as said connectors are brought toward one another.

9. A submersible optical wet connector assembly as claimed in claim 8,
wherein said liquid storage section includes a tank for storing detergent, and wherein a flow channel extends between said tank and said bore for placing said tank in communication with said bore.

10. A submersible optical wet connector assembly as claimed in claim 9,
and further comprising a check valve in said flow channel.

11. A submersible optical wet connector assembly as claimed in claim 9,
and further comprising detergent stored in said tank, said detergent having a refractive index which minimizes connection loss at said incoming/outgoing surfaces when applied to said incoming/outgoing surfaces.

12. A submersible optical wet connector assembly as claimed in claim 8,
wherein one of a movable plate having a compression spring attached thereto and self-restorable absorbent material is disposed in said bore.

13. A submersible optical wet connector assembly as claimed in claim 5,
wherein said first connector has a drain channel extending therethrough from a portion thereof adjacent said incoming/outgoing surfaces when such are confronting.

14. A submersible optical wet connector assembly as claimed in claim 5,
wherein said discharge port includes a filter.

15. A submersible optical wet connector assembly comprising:
a first connector comprising a female connector body;
said female connector body having a hole extending therein, and a first optical transmitting means disposed in said hole and having a free end thereof including an incoming/outgoing surface;
a second connector comprising a male connector body,
said male connector body having a respective hole extending therein, and a second optical transmitting means disposed in said respective hole, said second optical transmitting means having a respective free end thereof including a respective incoming/outgoing surface confronting said incoming/outgoing surface of said first optical transmitting means when said first and said second connectors have been brought together;
a liquid storage section integral with one of said connectors for containing a predetermined volume of liquid;
a liquid discharge port in communication with said liquid storage section and open at a location adjacent to said confronting incoming/outgoing surfaces; and
a pressurizing section integral with one of said connectors for compressing said liquid storage section as said first and said second connectors are brought toward one another to discharge liquid retained in said liquid storage section therefrom and through said discharge port as a jet stream directed toward said incoming/outgoing surfaces.

* * * * *